United States Patent
Zimerman et al.

(12)
(10) Patent No.: US 6,625,653 B1
(45) Date of Patent: Sep. 23, 2003

(54) NETWORK PROTECTION ARCHITECTURE

(75) Inventors: Yacov Zimerman, Elkana (IL); Beni Kopelovitz, Kfar Sava (IL)

(73) Assignee: ECI Telecom Ltd., Petach-Tikva (IL)

( * ) Notice: Subject to any disclaimer, the term of this patent is extended or adjusted under 35 U.S.C. 154(b) by 584 days.

(21) Appl. No.: 09/589,083

(22) Filed: Jun. 8, 2000

(51) Int. Cl.$^7$ ............................................... G06F 15/16
(52) U.S. Cl. ..................................................... 709/229
(58) Field of Search ................................. 709/223, 220, 709/227, 249, 251, 252

(56) References Cited

U.S. PATENT DOCUMENTS

| | | | | |
|---|---|---|---|---|
| 5,687,318 A | * | 11/1997 | Oksanen et al. | ........ 395/200.13 |
| 6,014,708 A | * | 1/2000 | Klish | ........................... 709/232 |
| 6,070,188 A | * | 5/2000 | Grant et al. | ................. 709/223 |
| 6,442,694 B1 | * | 8/2002 | Gergman et al. | ........... 713/201 |
| 6,452,934 B1 | * | 9/2002 | Nakata | ......................... 370/428 |

OTHER PUBLICATIONS

ITU–T Recommendation G.842 (04/97), Interworking of SDH Network Protection Architectures, pp 32.

* cited by examiner

*Primary Examiner*—David Y. Eng
(74) *Attorney, Agent, or Firm*—Nath & Associates PLLC; Harold L. Novick (57) ABSTRACT

A network protection architecture including a top ring with an I/O Node A having a transmit tributary $TT_A$ and a receive tributary $RT_A$, a top down west working channel $WC_{AB}$, a bottom up west working channel $WC_{BA}$, a top down east protection channel $PC_{AC}$, a bottom up east protection channel $PC_{CA}$, and two double switch interconnection nodes B and C; a bottom ring with an I/O Node Z having a transmit tributary $TT_Z$ and a receive tributary $RT_Z$, a top down west working channel $WC_{DZ}$, a bottom up west working channel $WC_{ZD}$, a top down east protection channel $PC_{EZ}$, a bottom up east protection channel $PC_{ZE}$, and two double switch interconnection nodes D and E; the interconnection nodes B and D having a receive line $RL_{BD}$ and a transmit line $TL_{DB}$ bridging thereacross; the interconnection nodes C and E having a receive line $RL_{CE}$ and a transmit line $TL_{EC}$ bridging thereacross; the interconnection node B having switches $S_1$ and $S_5$, the switch $S_1$ switching the receive line $RL_{BD}$ between the working channel $WC_{AB}$ and the protection channel $PC_{AC}$, and the switch $S_5$ switching the working channel $WC_{BA}$ between the transmit line $TL_{DB}$ and the transmit line $TL_{EC}$; the interconnection node C having switches $S_2$ and $S_6$, the switch $S_2$ switching the receive line $RL_{CE}$ between the working channel $WC_{AB}$ and the protection channel $PC_{AC}$, and the switch $S_6$ switching the protection channel $PC_{CA}$ between the transmit line $TL_{DB}$ and the transmit line $TL_{EC}$; the interconnection node D having switches $S_3$ and $S_7$, the switch $S_3$ switching the transmit line $TL_{DB}$ between the working channel $WC_{ZD}$ and the protection channel $PC_{ZE}$, and the switch $S_7$ switching the working channel $WC_{DZ}$ between the receive line $RL_{BD}$ and the receive line $RL_{CE}$; and the interconnection node E having switches $S_4$ and $S_8$, the switch $S_4$ switching the transmit line $TL_{EC}$ between the working channel $WC_{ZD}$ and the protection channel $PC_{ZE}$, and the switch $S_8$ switching the protection channel $PC_{EZ}$ between the receive line $RL_{BD}$ and the receive line $RL_{CE}$.

2 Claims, 8 Drawing Sheets

NETWORK PROTECTION ARCHITECTURE

FIELD OF THE INVENTION

The present invention relates to network protection architectures in general, and ring interworking architectures in particular.

BACKGROUND OF THE INVENTION

ITU-T Recommendation G.842 (April 1997) entitled "*Interworking of SDH Network Protection Architectures*" (hereinafter referred to as "G.842" and whose contents are incorporated by reference) discusses dual ring network protection architectures including inter alia a form of dual node interconnection termed ring interworking. One implementation of ring interworking is the so-called SubNetwork Connection Protection (SNCP) ring interworking architecture which is characterized by its top ring and its bottom ring being mirror images of one another.

Generally speaking, the term ring interworking refers to a dual ring network topology which includes top and bottom rings each having an I/O node with a transmit tributary and a receive tributary, two west working channels between the I/O node and an west interconnection node from the perspective of the top ring, and two east protection channels between the I/O node and an east interconnection node from the perspective of the top ring. The terms "working channel" and "protection channel" are purely descriptive to distinguish between two identical channels except that a ring's working channel is typically its default active channel in terms of signal flow therealong. Only one of a ring's working and protection channels may be active in terms of end-to-end signal flow therealong at any one time, if at all.

The opposite west interconnection nodes of the top and bottom rings define a west interconnection interface and, similarly, the opposite east interconnection nodes of the top and bottom rings define an east interconnection interface. Each interconnection interface has a pair of lines bridging across the rings, one of which is employed as a so-called top down receive line from the transmit tributary of the top ring's I/O node to the receive tributary of the bottom ring's I/O node via either a top down west working channel or a bottom up east protection channel. Conversely, the other line is employed as a so-called bottom up transmit line from the transmit tributary of the bottom ring's I/O node to the receive tributary of the top ring's I/O node via either a bottom up west working channel or a bottom up east working channel.

It is a commonly purported that ring interworking and, in particular, a G.842 compliant SNCP ring interworking architecture provides top down fiber optic network survivability as long as one of the top ring's top down working or protection channels, one of the bottom ring's top down working or protection channels, and one of the east or west interconnection interfaces' receive lines remain intact. However, topological analysis of a G.842 compliant SNCP ring interworking architecture reveals that the east and west interconnection interfaces' receive lines are each connectable to the receive tributary at the bottom ring's I/O node from their respective sides only from the perspective of the top ring, namely, the west interconnection interface's receive line is only connectable to the bottom ring's I/O node from the west and conversely the east interconnection interface's receive line is only connectable to the bottom ring's I/O node from the east. Due to this, a G.842 compliant SNCP ring interworking architecture cannot provide top down fiber optic integrity in the case of a double fiber optic failure involving the west interconnection interface's receive line and the bottom ring's east protection channel nor the east interconnection interface's receive line and the bottom ring's west working channel.

The above analysis equally applies to bottom up fiber optic network survivability by virtue of the symmetrical nature of a G.842 compliant SNCP ring interworking architecture.

There is a need to provide a network protection architecture with fiber optic network survivability capabilities above and beyond those of a G.842 compliant SNCP ring interworking architecture.

SUMMARY OF THE INVENTION

In accordance with the present invention, there is provided a network protection architecture comprising:

(a) a top ring with an I/O Node A having a transmit tributary $TT_A$ and a receive tributary $RT_A$, a top down west working channel $WC_{AB}$, a bottom up west working channel $WC_{BA}$, a top down east protection channel $PC_{AC}$, a bottom up east protection channel $PC_{CA}$, and two double switch interconnection nodes B and C;

(b) a bottom ring with an I/O Node Z having a transmit tributary $TT_Z$ and a receive tributary $RT_Z$, a top down west working channel $WC_{DZ}$, a bottom up west working channel $WC_{ZD}$, a top down east protection channel $PC_{EZ}$, a bottom up east protection channel $PC_{ZE}$, and two double switch interconnection nodes D and E;

(c) said interconnection nodes B and D having a receive line $RL_{BD}$ and a transmit line $TL_{DB}$ bridging thereacross;

(d) said interconnection nodes C and E having a receive line $RL_{CE}$ and a transmit line $TL_{EC}$ bridging thereacross;

(e) said interconnection node B having switches $S_1$ and $S_5$, said switch $S_1$ switching said receive line $RL_{BD}$ between said working channel $WC_{AB}$ between and said protection channel $PC_{AC}$, and said switch $S_5$ switching said working channel $WC_{BA}$ between said transmit line $TL_{DB}$ and said transmit line $TL_{EC}$;

(f) said interconnection node C having switches $S_2$ and $S_6$, said switch $S_2$ switching said receive line $RL_{CE}$ between said working channel $WC_{AB}$ and said protection channel $PC_{AC}$, and said switch $S_6$ switching said protection channel $PC_{CA}$ between said transmit line $TL_{DB}$ and said transmit line $TL_{EC}$;

(g) said interconnection node D having switches $S_3$ and $S_7$, said switch $S_3$ switching said transmit line $TL_{DB}$ between said working channel $WC_{ZD}$ and said protection channel $PC_{ZE}$, and said switch $S_7$ switching said working channel $WC_{DZ}$ between said receive line $RL_{BD}$ and said receive line $RL_{CE}$; and (h) said interconnection node E having switches $S_4$ and $S_8$, said switch $S_4$ switching said transmit line $TL_{EC}$ between said working channel $WC_{ZD}$ and said protection channel $PC_{ZE}$, and said switch $S_8$ switching said protection channel $PC_{EZ}$, between said receive line $RL_{BD}$ and said receive line $RL_{CE}$.

The network protection architecture of the present invention is based on the realization that a G.842 compliant SNCP ring interworking architecture with additional limited switching capability can provide full top down and bottom up fiber optic network survivability in the face of all fiber optic failures except truly catastrophic failures.

BRIEF DESCRIPTION OF THE DRAWINGS

In order to understand the present invention and to see how it may be carried out in practice, a preferred embodiment will now be described, by way of a non-limiting example only, with reference to the following drawings, in which.

DETAILED DESCRIPTION OF THE DRAWINGS

For the sake of clarity, so-called end-to-end active routes between a top ring's I/O node and a bottom ring's I/O node are shown in solid lines with large arrows depicting the direction of communication flow between the one of the node's transmit tributary and the other node's receive tributary. Against this, an inactive route originating at the transmit tributary of either the top ring's or the bottom ring's I/O node is shown in a solid line with small arrows depicting the direction of information flow therefrom irrespective of the existence of a fiber optic failure therealong.

The following nomenclature is employed hereinbelow: $T_A$ is the transmit signal at the top ring's I/O node's transmit tributary; $R_A$ is the receive signal at the top ring's I/O node's receive tributary, if any; $AZ_1$ is the signal along the west interconnection interface's receive line, if any; $ZA_1$ is the signal along the west interconnection interface's transmit line, if any; $AZ_2$ is the signal along the east interconnection interface's receive line, if any; $ZA_2$ is the signal along the east interconnection interface's transmit line, if any; $T_Z$ is the transmit signal at the bottom ring's I/O node's transmit tributary; and $R_Z$ is the receive signal at the bottom ring's I/O node's receive tributary, if any.

Figure 1:
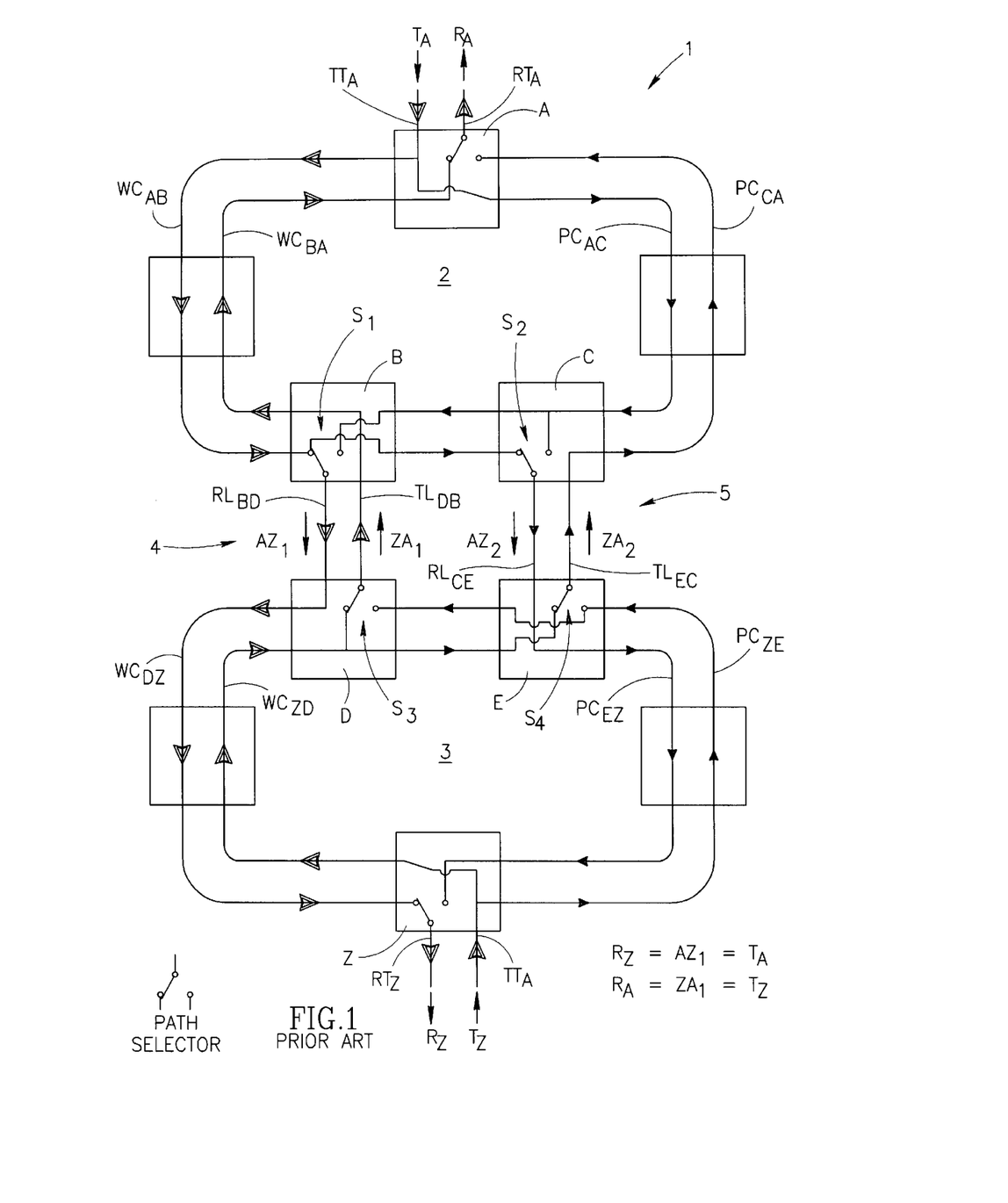
FIG. 1 is a schematic representation of a failure free G.842 compliant SNCP ring interworking architecture.

FIG. 1 shows a failure free G.842 compliant SNCP ring interworking architecture 1 (hereinafter referred to as "the architecture 1") having a top ring 2 with an I/O Node A having a transmit tributary $TT_A$ and a receive tributary $RT_A$, a top down west working channel $WC_{AB}$, a bottom up west working channel $WC_{BA}$, a top down east protection channel $PC_{AC}$, a bottom up east protection channel $PC_{CA}$, and two single switch interconnection nodes B and C respectively having switches $S_1$ and $S_2$. Similarly, the architecture 1 has a bottom ring 3 with an I/O Node Z having a transmit tributary $TT_Z$ and a receive tributary $RT_Z$, a top down west working channel $WC_{DZ}$, a bottom up west working channel $WC_{ZD}$, a top down east protection channel $PC_{EZ}$, a bottom up east protection channel $PC_{ZE}$, and two single switch interconnection nodes D and E respectively having switches $S_3$ and $S_4$. The two interconnection nodes B and D, and the two interconnection nodes C and E, respectively define west and east interconnection interfaces 4 and 5 having two receive lines $RL_{BD}$ and $RL_{CE}$ and two transmit lines $TL_{DB}$ and $TL_{EC}$. Both the switches $S_1$ and $S_2$ respectively switch the receive lines $RL_{BD}$ and $RL_{CE}$ between the working channel $WC_{AB}$ and the protection channel $PC_{AC}$. Both the switches $S_3$ and $S_4$ respectively switch the transmit lines $TL_{DB}$ and $TL_{EC}$ between the working channel $WC_{ZD}$ and the protection channel $PC_{ZE}$. As shown, the failure free architecture 1 employs top down and bottom up active routes between the I/O Node A and the I/O Node Z such that: $R_Z=AZ_1=T_A$ and $R_A=ZA_1=T_Z$.

Figure 2:
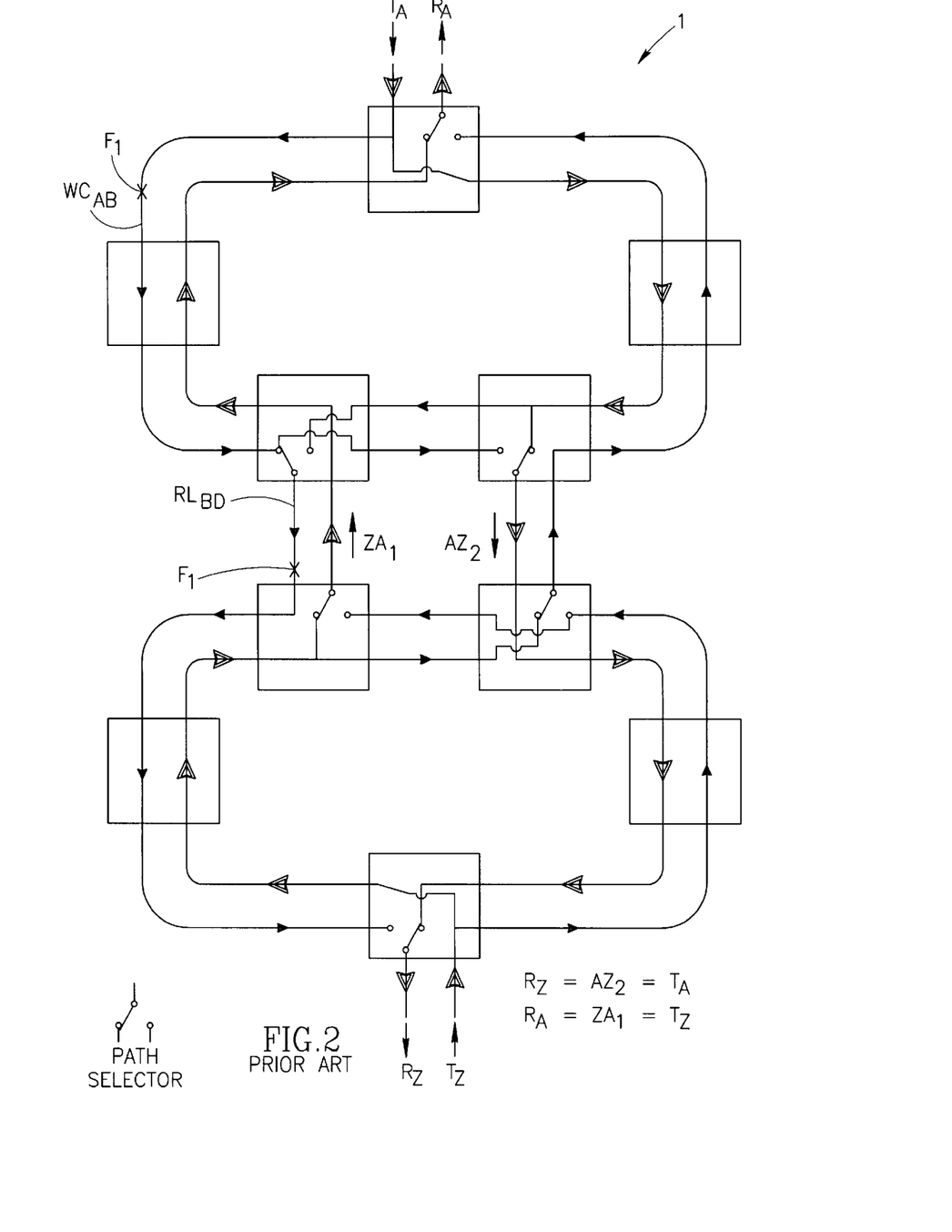
FIG. 2 is a schematic representation of the network protection architecture of FIG. 1 displaying fiber optic network survivability in the face of a first exemplary double fiber optic failure.

FIG. 2 shows that the architecture 1 even though incurring a double fiber optic failure denoted $F_1$ along the working channel $WC_{AB}$ and the receive line $RL_{BD}$ still retains both top down and bottom up active routes between the I/O Node A and the I/O Node Z such that: $R_Z=AZ_2=T_A$ and $R_A=ZA_1=T_Z$.

Figure 3:
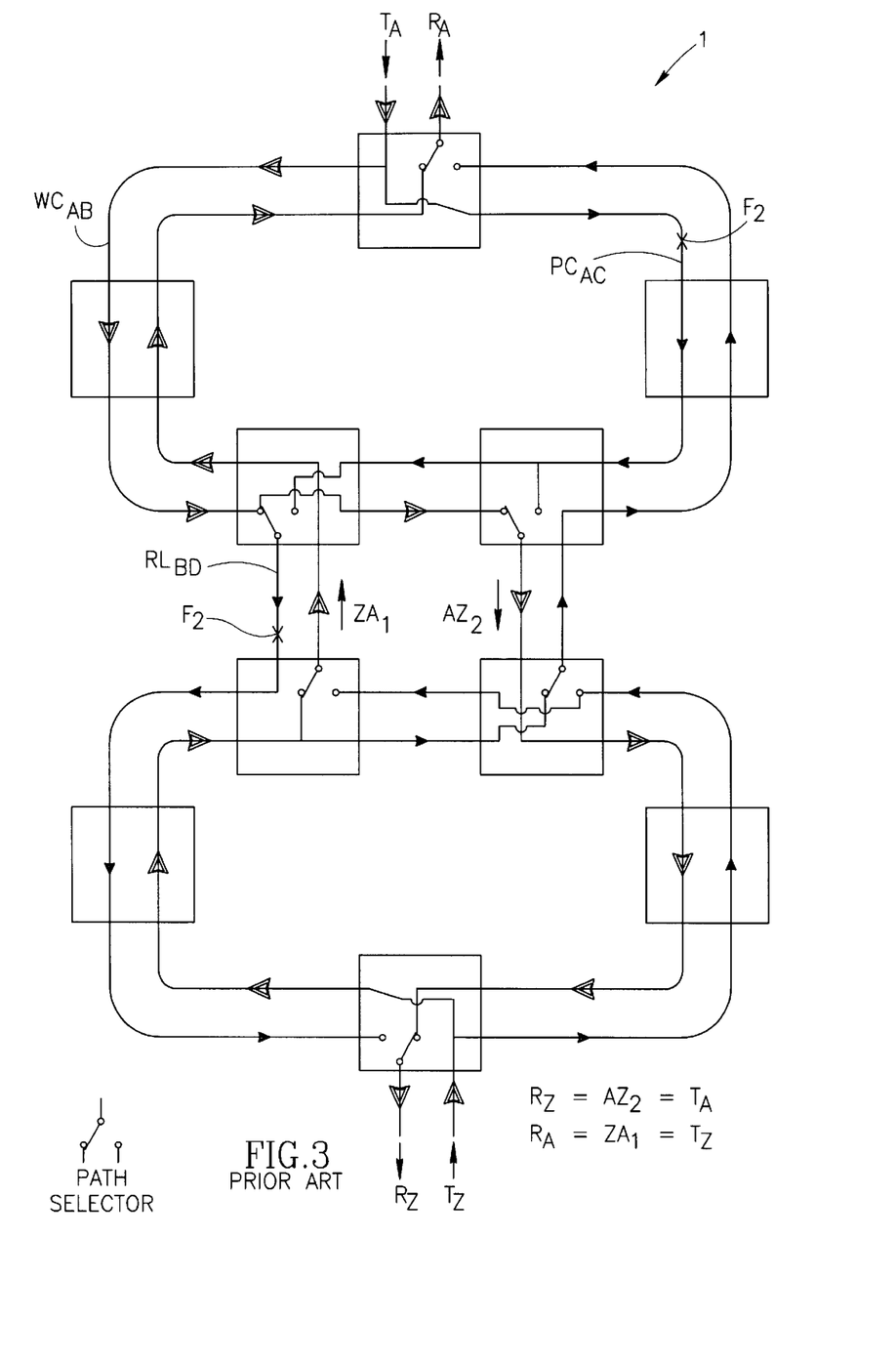
FIG. 3 is a schematic representation of the network protection architecture of FIG. 1 displaying fiber optic network survivability in the face of a second exemplary double fiber optic failure.

FIG. 3 shows that the architecture 1 even though incurring a double fiber optic failure denoted $F_2$ along the protection channel $PC_{AC}$ and the receive line $RL_{BD}$ still retains both top down and bottom up active routes between the I/O Node A and the I/O Node Z such that: $R_Z=AZ_2=T_A$ and $R_A=ZA_1=T_Z$.

Figure 4:
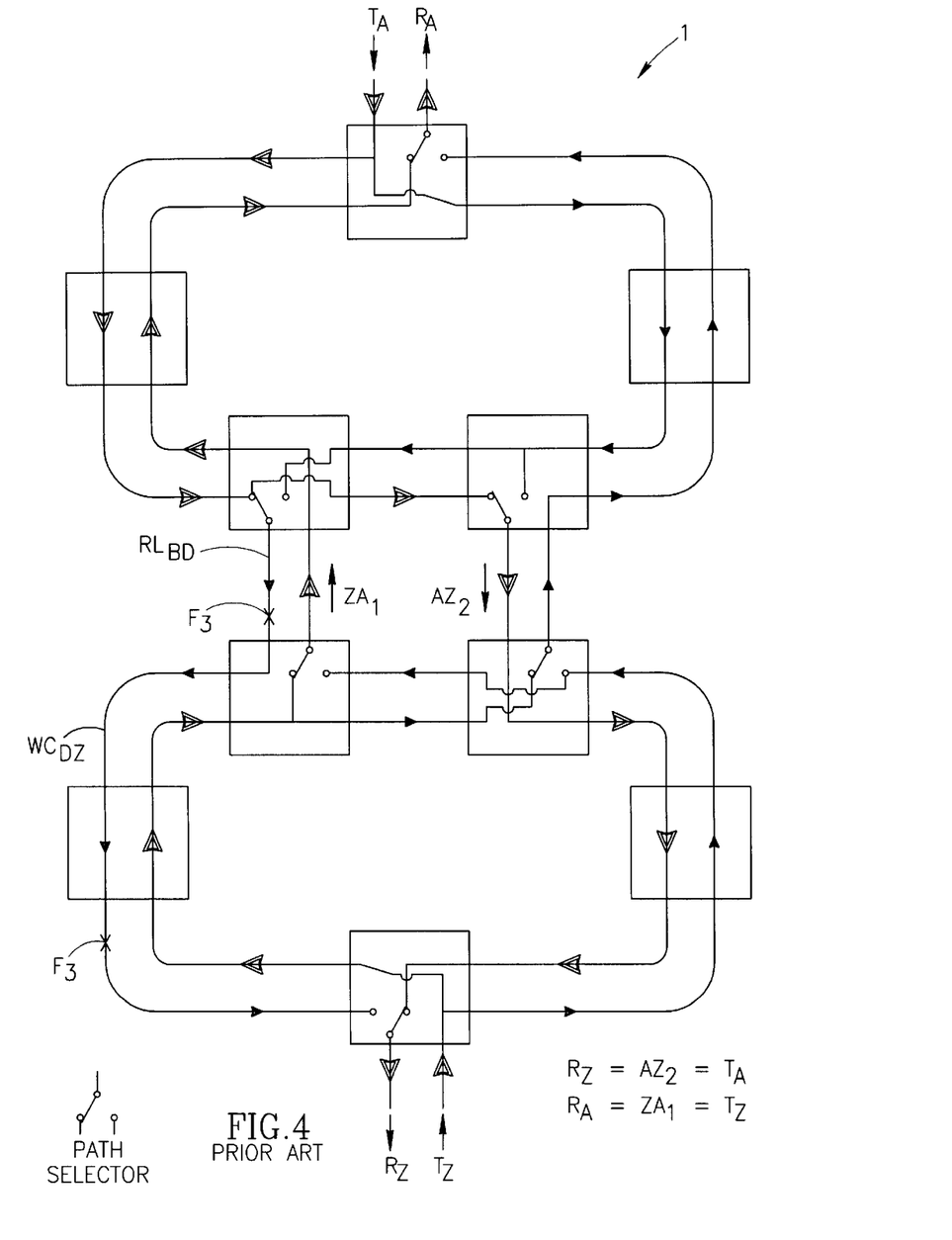
FIG. 4 is a schematic representation of the network protection architecture of FIG. 1 displaying fiber optic network survivability in the face of a third exemplary double fiber optic failure.

FIG. 4 shows that the architecture 1 even though incurring a double fiber optic failure denoted $F_3$ along the working channel $WC_{DZ}$ and the receive line $RL_{BD}$ still retains both top down and bottom up active routes between the I/O Node A and the I/O Node Z such that: $R_Z=AZ_2=T_A$ and $R_A=ZA_1=T_Z$.

Figure 5:
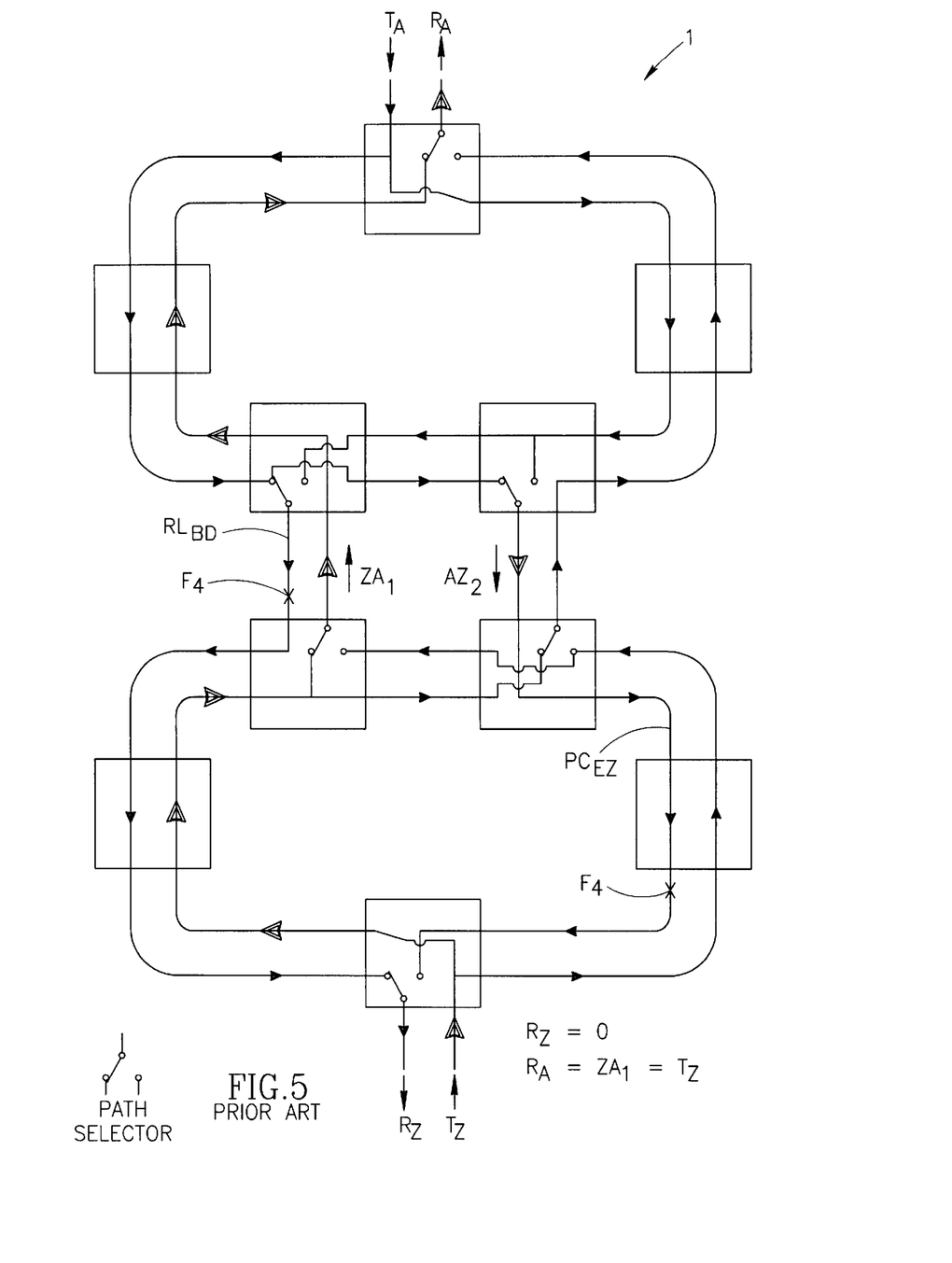
FIG. 5 is a schematic representation of the network protection architecture of FIG. 1 displaying fiber optic network failure in the face of a fourth exemplary double fiber optic failure.

FIG. 5 shows that the architecture 1 when incurring a double fiber optic failure denoted $F_4$ along the protection channel $PC_{EZ}$, and the receive line $RL_{BD}$ only retains a bottom up active route between the I/O Node A and the I/O Node Z such that: $R_Z=0$ and $R_{A=ZA_1}=T_Z$.

Figure 6:
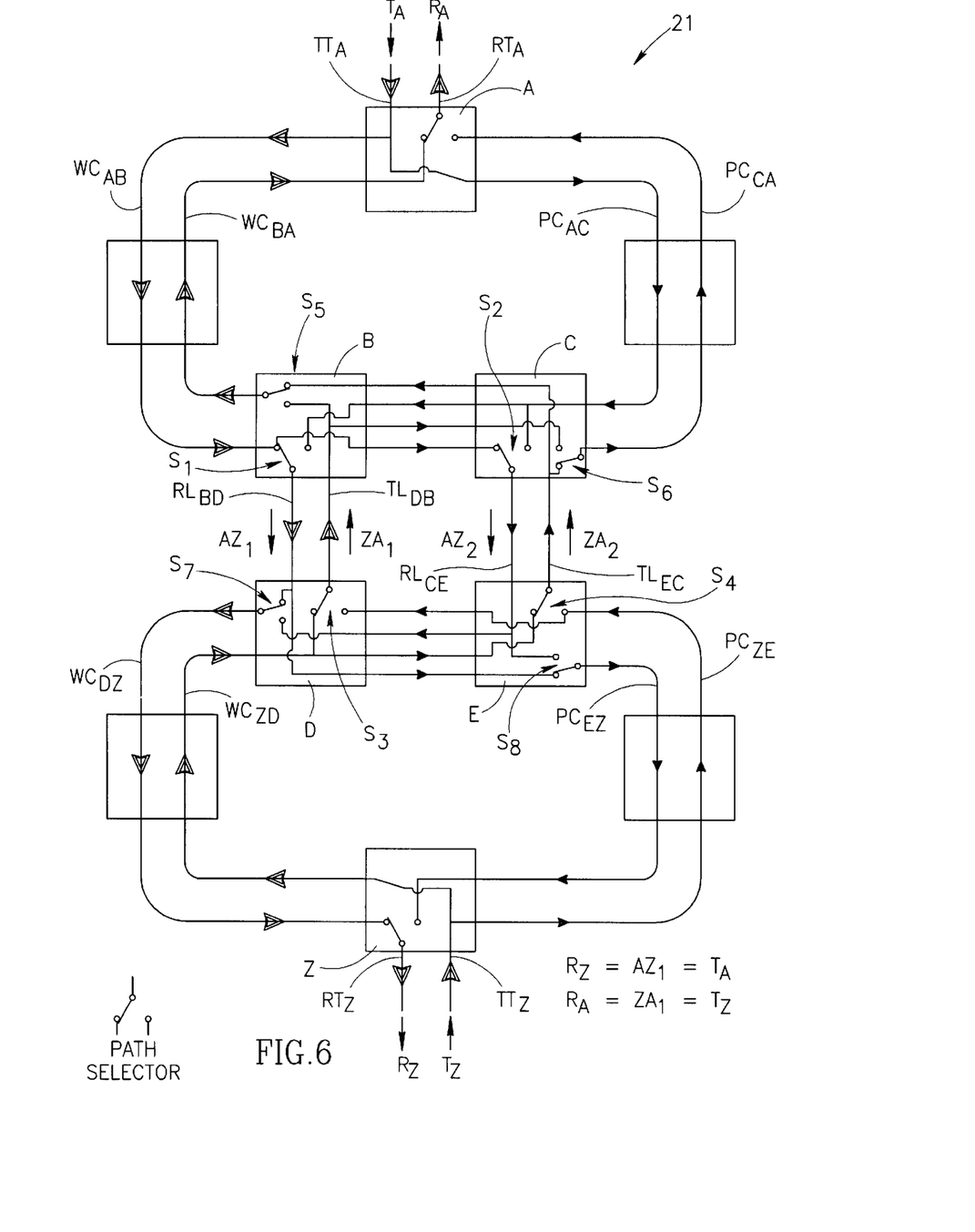
FIG. 6 is a schematic representation of a failure free network protection architecture in accordance with the present invention.

FIG. 6 shows a failure free network protection architecture 21 based on the architecture 1 and further including an additional switch in each one of the interconnection nodes B, C, D and E. The interconnection node B includes an additional switch $S_5$ for switching the working channel $WC_{BA}$ between the transmit lines $TL_{DB}$ and $TL_{EC}$. The interconnection node C includes an additional switch $S_6$ for switching the protection channel $PC_{CA}$ between the transmit lines $TL_{DB}$ and $TL_{EC}$. The interconnection node D includes an additional switch $S_7$ for switching the working channel $WC_{DZ}$ between the receive lines $RL_{BD}$ and $RL_{CE}$. The interconnection node E includes an additional switch $S_8$ for switching the protection channel $PC_{EZ}$, between the receive lines $RL_{BD}$ and $RL_{CE}$. The active routes in failure free architecture 21 are identical to the active routes in the failure free architecture 1 such that $R_Z=AZ_1=T_A$ and $R_A=ZA_1=T_Z$.

Figure 7:
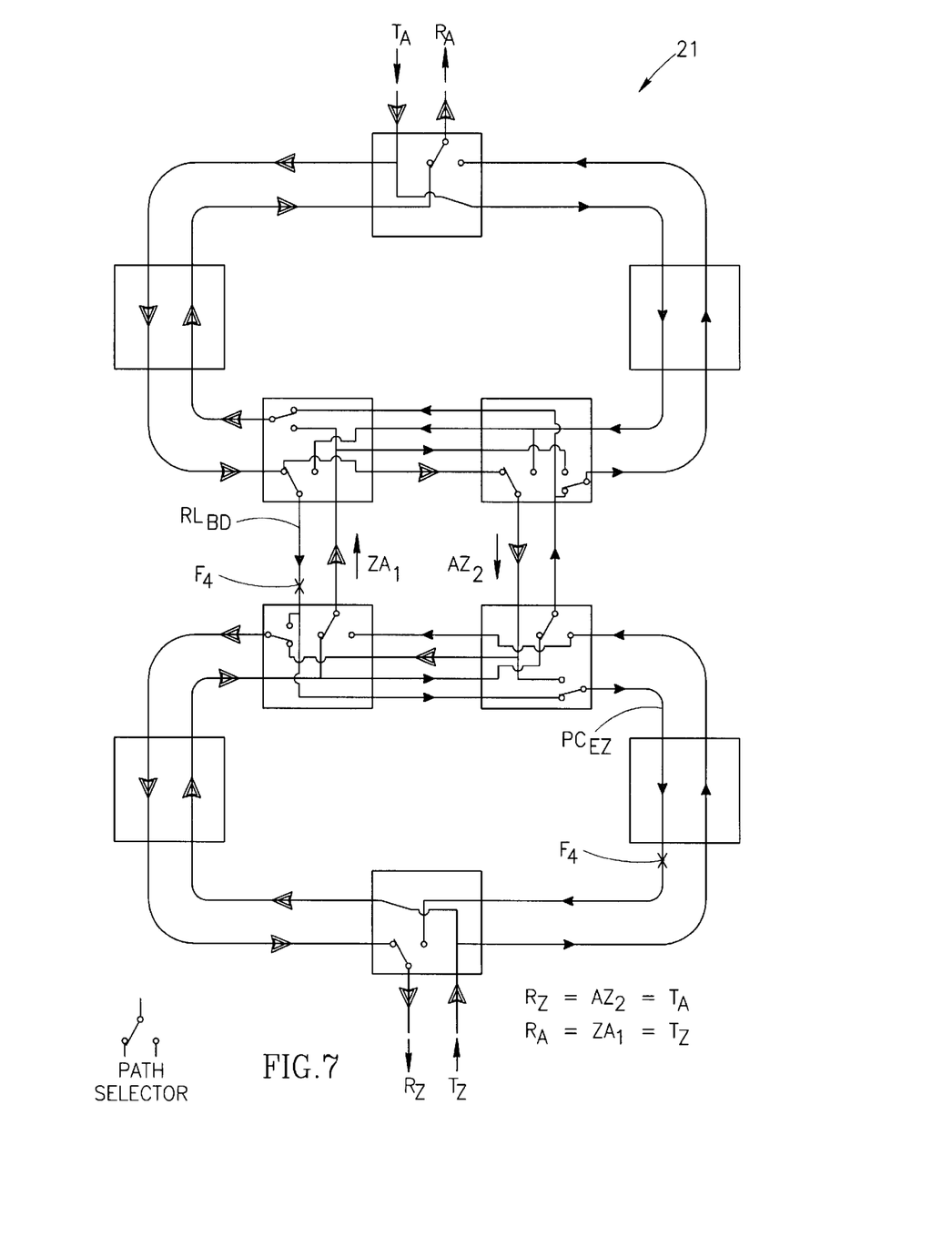
FIG. 7 is a schematic representation of the network protection architecture of FIG. 6 displaying fiber optic network survivability in the face of the double fiber optic failure of FIG. 5.

FIG. 7 shows that the architecture 21 retains a top down active route between the I/O Node A and the I/O Node Z even in the face of the double fiber optic failure $F_4$ such that $R_Z=AZ_2=T_A$ and $R_A=ZA_1=T_Z$.

Figure 8:
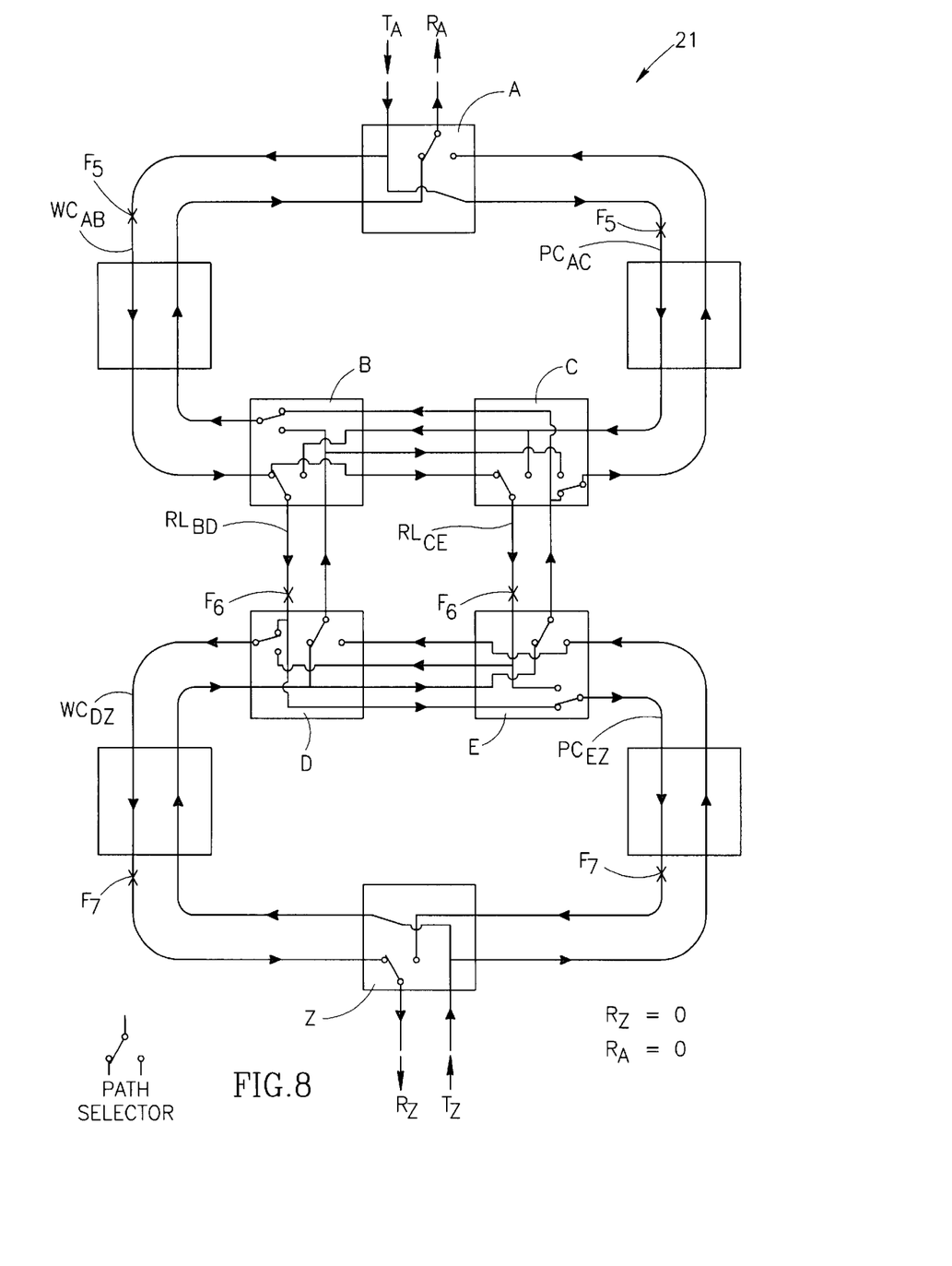
FIG. 8 is a schematic representation of the network protection architecture of FIG. 6 displaying fiber optic network failure in the face of a truly catastrophic failure.

FIG. 8 shows that the architecture 21 does not display fiber optic network survivability in the top down direction in the face of truly catastrophic double fiber optic failures, namely, a double fiber optic fiber failure denoted $F_5$ in the working channel $WC_{AB}$ and the protection channel $PC_{AC}$; double fiber optic failure denoted $F_6$ in the receive lines $RL_{BD}$ and $RL_{CE}$; and a double fiber optic failure denoted $F_7$ in the working channel $WC_{DZ}$ and the protection channel $PC_{EZ}$. Neither does the architecture 21 provide fiber optic network survivability in the bottom up direction in the face of mirror image double fiber optic failures to the double fiber optic failures $F_5$, $F_6$ and $F_7$. It should be appreciated that the above mentioned truly catastrophic failures also disrupt fiber optic network survivability of the G.842 compliant SNCP ring interworking architecture 1.

Moreover, neither the architecture 1 nor the architecture 21 provide network integrity in the case of nodal failure at either one or both of the I/O nodes A and Z, and/or simultaneous nodal failures of the interconnection nodes B and C, the interconnection nodes D and E, the interconnection nodes B and E, and the interconnection nodes C and D.

While the invention has been described with respect to a limited number of embodiments, it can be appreciated that many variations, modifications, and other applications of the invention can be made without departing from the scope of the claims appended hereto as follows: First, the two interconnection nodes on each of the two rings can be combined into a single interconnection node. Second, the top ring of the architecture 21 can be dispensed with except for its I/O Node A which can be directly connected to the receive lines $RL_{BD}$ and $RL_{CE}$ and the transmit lines $TL_{DB}$ and $TL_{EC}$ whilst still benefiting from the present invention. Third, the invention can be implemented in other transmission technologies including SONET, DWDM, and others, and also the fiber optic links can be replaced by other transmission media.

What is claimed is:

1. A network protection architecture comprising:
   (a) a top ring with an I/O Node A having a transmit tributary $TT_A$ and a receive tributary $RT_A$, a top down west working channel $WC_{AB}$, a bottom up west working channel $WC_{BA}$, a top down east protection channel $PC_{AC}$, a bottom up east protection channel $PC_{CA}$, and two double switch interconnection nodes B and C;
   (b) a bottom ring with an I/O Node Z having a transmit tributary $TT_Z$ and a receive tributary $RT_Z$, a top down west working channel $WC_{DZ}$, a bottom up west working channel $WC_{ZD}$, a top down east protection channel $PC_{EZ}$, a bottom up east protection channel $PC_{ZE}$, and two double switch interconnection nodes D and E;
   (c) said interconnection nodes B and D having a receive line $RL_{BD}$ and a transmit line $TL_{DB}$ bridging thereacross;
   (d) said interconnection nodes C and E having a receive line $RL_{CE}$ and a transmit line $TL_{EC}$ bridging thereacross;
   (e) said interconnection node B having switches $S_1$ and $S_5$, said switch $S_1$ switching said receive line $RL_{BD}$ between said working channel $WC_{AB}$ and said protection channel $PC_{AC}$, and said switch $S_5$ switching said working channel $WC_{BA}$ between said transmit line $TL_{DB}$ and said transmit line $TL_{EC}$;
   (f) said interconnection node C having switches $S_2$ and $S_6$, said switch $S_2$ switching said receive line $RL_{CE}$ between said working channel $WC_{AB}$ and said protection channel $PC_{AC}$, and said switch $S_6$ switching said protection channel $PC_{CA}$ between said transmit line $TL_{DB}$ and said transmit line $TL_{EC}$;
   (g) said interconnection node D having switches $S_3$ and $S_7$, said switch $S_3$ switching said transmit line $TL_{DB}$ between said working channel $WC_{ZD}$ and said protection channel $PC_{ZE}$, and said switch $S_7$ switching said working channel $WC_{DZ}$ between said receive line $RL_{BD}$ and said receive line $RL_{CE}$; and
   (h) said interconnection node E having switches $S_4$ and $S_8$, said switch $S_4$ switching said transmit line $TL_{EC}$ between said working channel $WC_{ZD}$ and said protection channel $PC_{ZE}$, and said switch $S_8$ switching said protection channel $PC_{EZ}$, between said receive line $RL_{BD}$ and said receive line $RL_{CE}$.

2. The architecture according to claim 1 wherein said two interconnection nodes on a ring are combined into a single interconnection node.

* * * * *